United States Patent
Christensen et al.

(10) Patent No.: US 10,572,388 B2
(45) Date of Patent: Feb. 25, 2020

(54) MANAGED NVM ADAPTIVE CACHE MANAGEMENT

(71) Applicant: Micron Technology, Inc., Boise, ID (US)

(72) Inventors: Carla L. Christensen, Boise, ID (US); Jianmin Huang, San Carlos, CA (US); Sebastien Andre Jean, Meridian, ID (US); Kulachet Tanpairoj, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/691,147

(22) Filed: Aug. 30, 2017

(65) Prior Publication Data

US 2019/0065388 A1 Feb. 28, 2019

(51) Int. Cl.
*G06F 12/08* (2016.01)
*G06F 12/02* (2006.01)
*G06F 3/06* (2006.01)
*G06F 12/0893* (2016.01)

(52) U.S. Cl.
CPC ........ *G06F 12/0893* (2013.01); *G06F 3/0616* (2013.01); *G06F 3/0625* (2013.01); *G06F 3/0634* (2013.01); *G06F 3/0656* (2013.01); *G06F 3/0679* (2013.01); *G06F 12/0246* (2013.01); *G06F 2212/1016* (2013.01); *G06F 2212/222* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 5,930,738 | A * | 7/1999 | Jones | G06F 9/4401 360/97.12 |
| 5,931,951 | A * | 8/1999 | Ando | G06F 1/3228 711/141 |
| 6,052,789 | A * | 4/2000 | Lin | G06F 1/3203 365/229 |
| 7,164,601 | B2 * | 1/2007 | Mitani | G11C 8/10 365/185.03 |

(Continued)

OTHER PUBLICATIONS

An Approach for Adaptive DRAM Temperature and Power Management by Liu ACM 2008 (Year: 2008).*

(Continued)

*Primary Examiner* — Paul M Knight
(74) *Attorney, Agent, or Firm* — Schwegman Lundberg & Woessner, P.A.

(57) ABSTRACT

Disclosed in some examples are memory devices which feature customizable Single Level Cell (SLC) and Multiple Level Cell (MLC) configurations. The configuration (e.g., the size and position) of the SLC cache may have an impact on power consumption, speed, and other performance of the memory device. An operating system of an electronic device to which the memory device is installed may wish to achieve different performance of the device based upon certain conditions detectable by the operating system. In this way, the performance of the memory device can be customized by the operating system through adjustments of the performance characteristics of the SLC cache.

14 Claims, 9 Drawing Sheets

(56) References Cited

U.S. PATENT DOCUMENTS

| | | | |
|---|---|---|---|
| 8,479,080 B1* | 7/2013 | Shalvi | G06F 11/10 |
| | | | 714/774 |
| 8,886,911 B2 | 11/2014 | Nemazie et al. | |
| 2002/0101715 A1* | 8/2002 | Osecky | G06F 1/206 |
| | | | 361/679.46 |
| 2003/0135770 A1* | 7/2003 | Bhogal | G06F 1/3221 |
| | | | 713/320 |
| 2004/0117669 A1* | 6/2004 | Wilson | G06F 1/206 |
| | | | 713/300 |
| 2005/0068799 A1* | 3/2005 | Bedwell | G06F 1/3203 |
| | | | 365/63 |
| 2006/0122805 A1* | 6/2006 | Coulson | G06F 1/206 |
| | | | 702/130 |
| 2007/0055901 A1* | 3/2007 | Van Der Heijden | |
| | | | G06F 1/3225 |
| | | | 713/320 |
| 2008/0215800 A1 | 9/2008 | Lee et al. | |
| 2008/0235441 A1* | 9/2008 | Sherman | G06F 1/3203 |
| | | | 711/103 |
| 2010/0122016 A1 | 5/2010 | Marotta et al. | |
| 2010/0250856 A1* | 9/2010 | Owen | G06F 12/084 |
| | | | 711/128 |
| 2012/0117406 A1* | 5/2012 | Eun | H04W 52/0216 |
| | | | 713/323 |
| 2012/0173807 A1 | 7/2012 | Lasser | |
| 2012/0224425 A1 | 9/2012 | Fai et al. | |
| 2012/0311293 A1 | 12/2012 | Nemazie et al. | |
| 2013/0046920 A1 | 2/2013 | Ryu et al. | |
| 2013/0166818 A1* | 6/2013 | Sela | G06F 12/0246 |
| | | | 711/103 |
| 2013/0219146 A1* | 8/2013 | Confalonieri | G06F 12/0246 |
| | | | 711/202 |
| 2014/0059406 A1 | 2/2014 | Hyun et al. | |
| 2014/0063939 A1 | 3/2014 | Marcu et al. | |
| 2014/0071753 A1* | 3/2014 | Shin | G06F 12/0246 |
| | | | 365/185.03 |
| 2014/0189199 A1* | 7/2014 | Blount | G06F 12/0802 |
| | | | 711/103 |
| 2015/0046637 A1* | 2/2015 | Chien | G11C 7/04 |
| | | | 711/103 |
| 2015/0301754 A1* | 10/2015 | Kochar | G06F 3/0679 |
| | | | 711/103 |
| 2016/0070336 A1* | 3/2016 | Kojima | G06F 12/0246 |
| | | | 711/103 |
| 2016/0093384 A1* | 3/2016 | Lee | G11C 16/24 |
| | | | 365/185.12 |
| 2016/0225459 A1* | 8/2016 | Boysan | G11C 16/30 |
| 2017/0285718 A1* | 10/2017 | Lai | G06F 1/324 |
| 2017/0315931 A1* | 11/2017 | Liu | G06F 12/02 |
| 2019/0057031 A1* | 2/2019 | Kern | G06F 3/0608 |

OTHER PUBLICATIONS

The Effect of Temperature on Cache Size Tuning for Low Energy Embedded Systems by Noori ACM 2007 (Year: 2007).*

Gasior, Geoff, "Micron's M600 SSD acceletrates writes with dynamic SLC cache", Micron—The Tech Report, [Online]. Retrieved from the Internet: <URL: techreport.com/news/27056/micron-m600-ssd-accelerates-writes-with-dynamic-slc-cache>, (Jul. 26, 2017), 3 pgs.

Glen, Dave, "Optimized Client Computing With Dynamic Write Acceleration", Micron, (2014), 5 pgs.

"International Application Serial No. PCT/US2018/047195, International Search Report dated Dec. 5, 2018", 11 pgs.

"International Application Serial No. PCT/US2018/047195, Written Opinion dated Dec. 5, 2018", 4 pgs.

Lee, Sungjin, et al., "FlexFS: A Flexible Flash File System for MLC NAND Flash Memory", Seoul National University, Korea Samsung Electronics, Korea, (Jun. 2009), 14 pgs.

* cited by examiner

MANAGED NVM ADAPTIVE CACHE MANAGEMENT

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
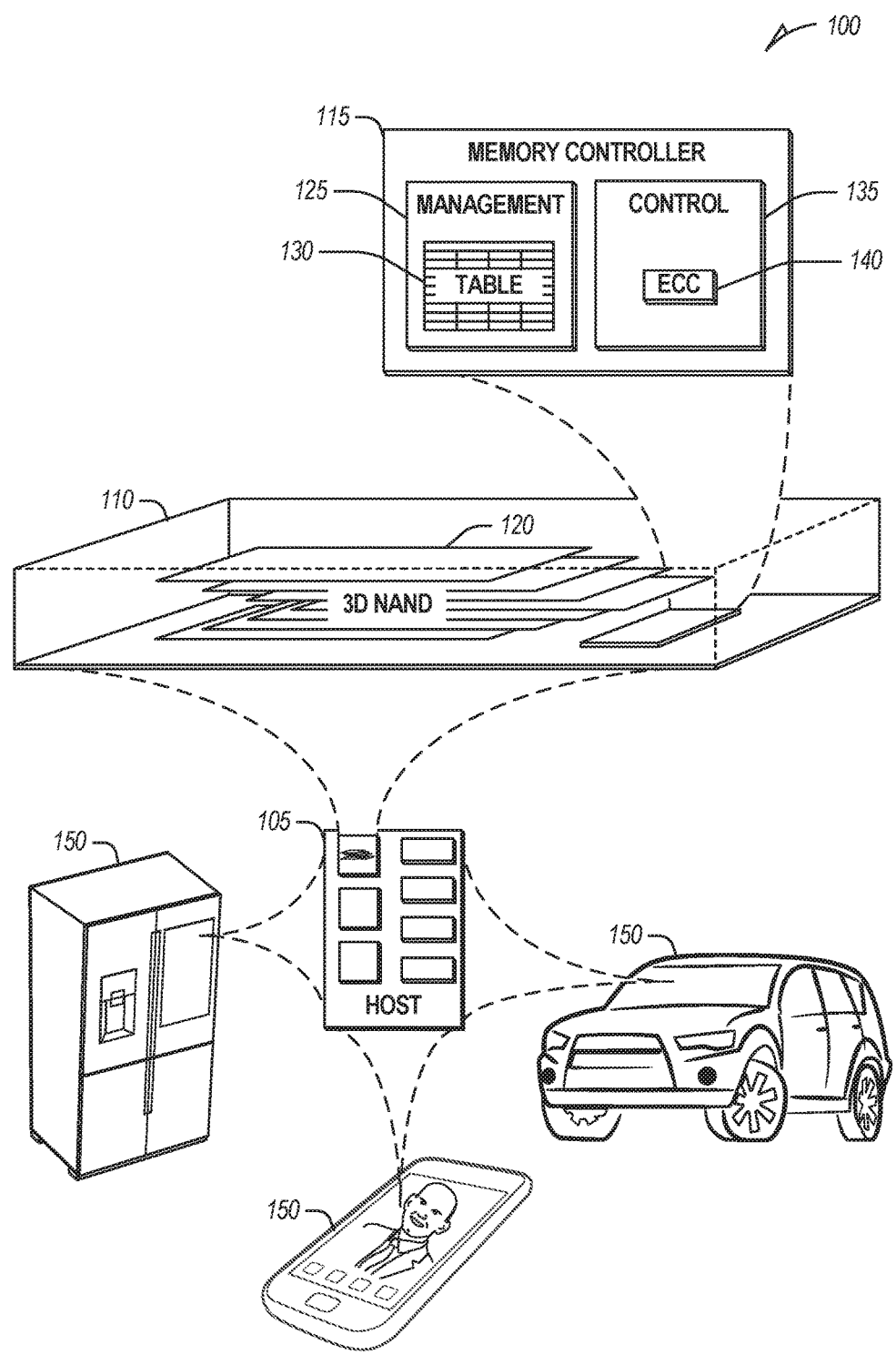
FIG. 1 illustrates an example of an environment including a memory device according to some examples of the present disclosure.

Memory devices may comprise a plurality of memory cells that are reconfigurable between Single Level Cell (SLC) and Multiple Level Cell (MLC) configurations. In some examples, the memory device configures some SLC cells to serve as a high-speed cache for write requests. Data is first written to the higher preforming SLC cells and then later may be rewritten to cells that are configured as MLC cells. The number of cells configured as part of the SLC cache may vary during operation of the memory device. For example, as the memory device fills up, the memory device may reconfigure SLC cells to be MLC cells to increase storage capacity. These techniques provide SLC level performance with the storage capacity of a memory device with MLC memory cells.

The configuration (e.g., the size and position) of the SLC cache may have an impact on power consumption, speed, and other performance of the memory device. An operating system of an electronic device in which the memory device is installed may wish to achieve different performance characteristics of the device based upon certain conditions detectable by the operating system. For example, to achieve lower power consumption in response to a low battery condition, the operating system may notify the memory device, which may adjust the SLC cache behavior to lower power consumption. In other examples, the operating system may deduce a degradation or other condition of the memory device and may either issue instructions to the device to reconfigure the device to have more SLC storage (which is more reliable) or may compress or delete extraneous files (which may have the effect of lowering LBA utilization and thus migrating MLC to SLC cache). In this way, the performance of the memory device can be customized by the operating system through adjustments of the performance characteristics of the SLC cache, either explicitly by sending a message or implicitly by changing the storage on the memory device to cause a shift in SLC cache performance.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 900 of FIG. 9.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with hall the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
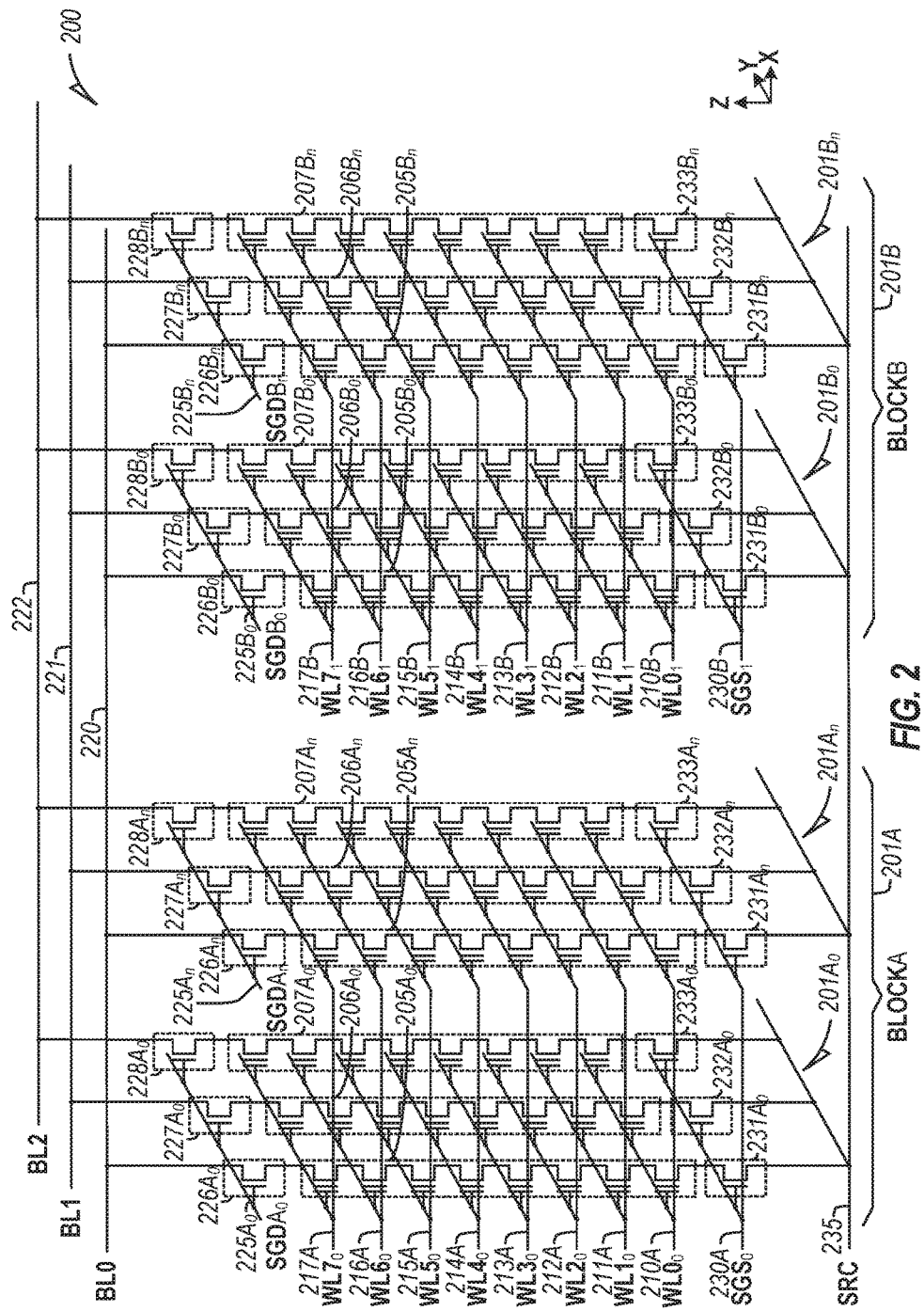
FIGS. 2-3 illustrate schematic diagrams of an example of a 3D NAND architecture semiconductor memory array according to some examples of the present disclosure.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $2016_0$, sub-block $B_n$, $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$, can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
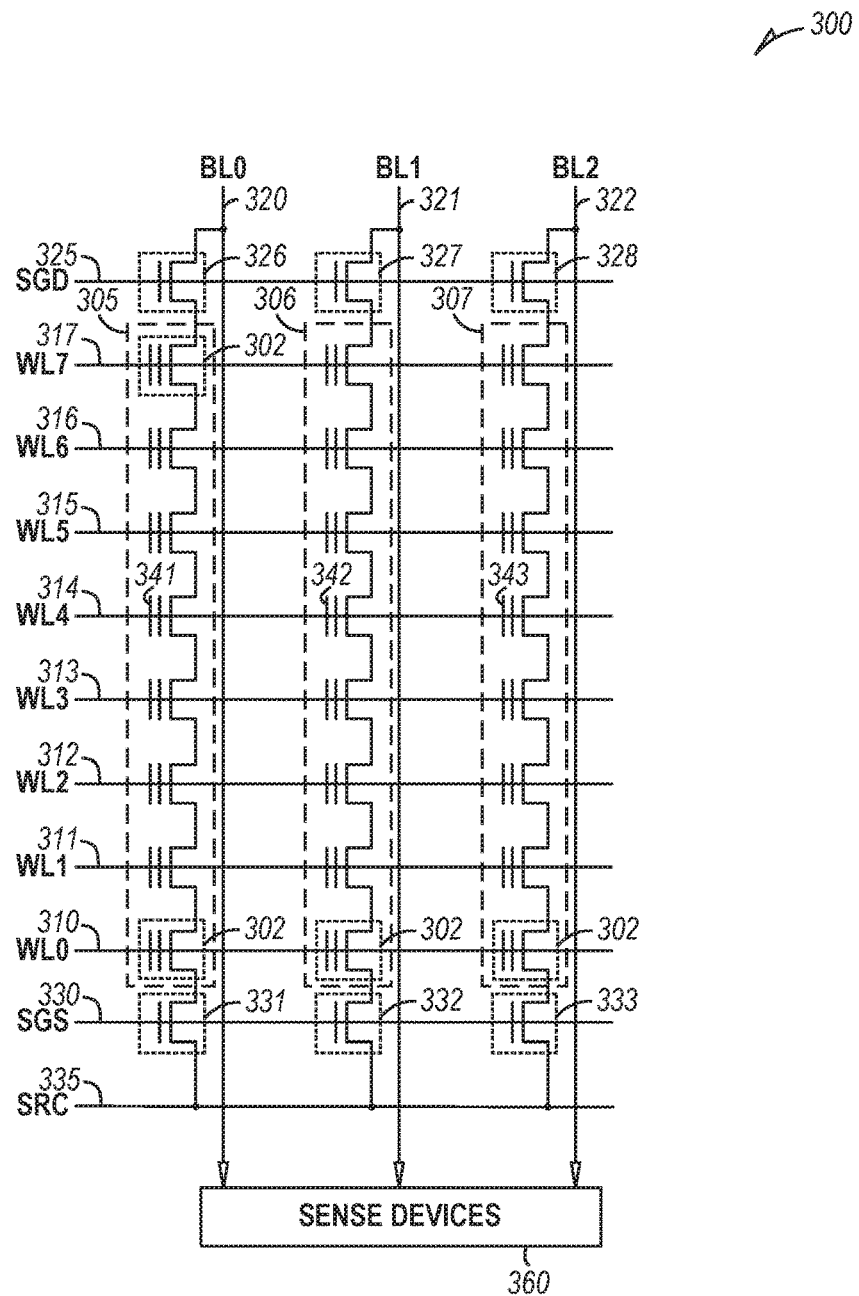

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
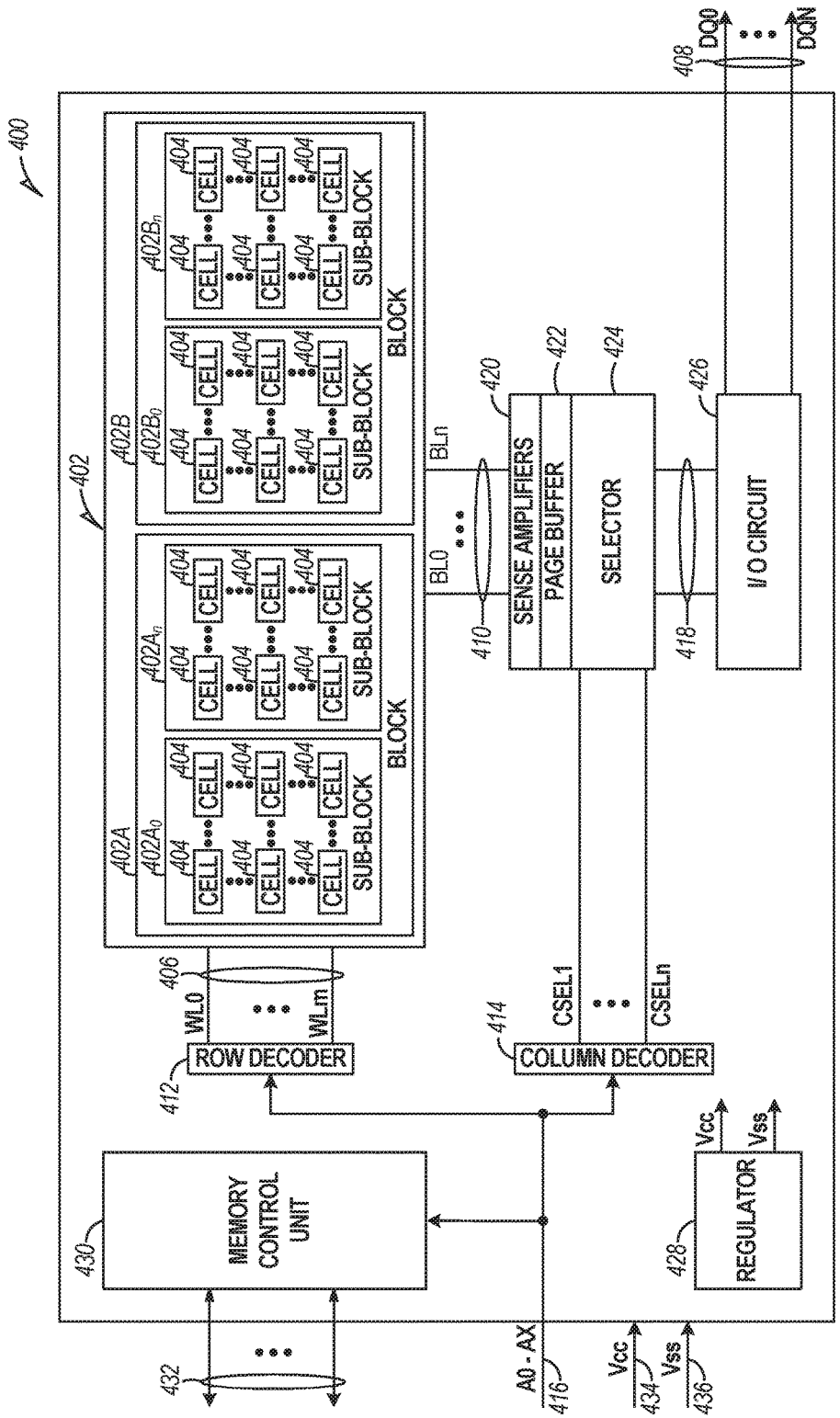
FIG. 4 illustrates an example block diagram of a memory module according to some examples of the present disclosure.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

In typical memory devices, the operating system of an electronic device and the firmware of the memory device installed in the electronic device would benefit from synchronizing more fully the performance of the memory device with respect to the performance needs and demands of the electronic device. For example, when the electronic device is low on battery power, lowering the memory device's power usage would be beneficial. As another example, prior to a large transfer of files, it would be beneficial to increase the speed of the memory device. Present operating systems and memory devices are not synchronized in this manner.

Disclosed are methods, systems, and machine readable mediums which allow for control of memory device performance characteristics by the operating system of an electronic device through modification of SLC cache behavior characteristics. These mechanisms provide the operating system with a way to change the performance characteristics of the memory device on the fly in response to changing operating conditions. Example memory device performance characteristics include speed, power usage, temperature output, data integrity, and free space. Example SLC cache behavior characteristics that may be modified include the configuration of the SLC cache, the behavior of the SLC cache, and in some examples, cache operations may be triggered (e.g., garbage collection).

In some examples, the operating system may modify memory device performance characteristics by sending a message to the firmware of the memory device across a communications interface (e.g., UFS). The operating system may send one or more electronic device state indications to the memory device which may cause changes to the configuration and/or behavior of the SLC cache. Electronic device state indications may be indications by the operating system to the memory device of a state of an electronic device in which the memory device is installed. In other examples, rather than explicitly change the memory device performance characteristics, the operating system may write or erase data to change an SLC cache configuration (e.g., a size) and thus change memory device performance characteristics.

An example electronic device state indication is a low power indication that indicates that a battery monitored by the operating system may be low. In response the memory device may reconfigure the memory cells to have less SLC cache (and more MLC cache), and/or bypass the SLC cache on new writes which saves power. Another example electronic device state indication may be an impending large transfer. In this indication, the operating system may determine or predict that a large amount of data may be written within a predetermined amount of time. For example, the operating system may prepare for receiving, sending, or recording streaming audio or video. In response the memory device may increase the size of the SLC cache in anticipation of the large data transfer to provide peak performance.

Yet another example electronic device state indication includes a high ambient temperature indication. This indication may be triggered in response to the operating system detecting an ambient temperature (as monitored by a temperature sensor that is part of the electronic device but is not part of the memory device) detecting an air temperature of the environment of the electronic device exceeding a threshold. The memory device may take actions such as limiting the use of SLC cache to lower memory device heat production in an effort to maintain cool temperatures of the memory device and avoid thermal throttling.

Still another example electronic device state indication is an impending sleep or hibernate indication. This indication allows the memory device to do various garbage collection operations and/or move data from the SLC cache into the MLC storage.

As noted, in some examples, rather than sending an electronic device state indication, an operating system may erase, move, or write data to the memory device to affect the reconfiguration of the SLC cache without explicit direction. This takes advantage of the fact that in some memory devices, the amount of SLC cache is determined by the logical block addressing (LBA) allocation. As more LBA is allocated, the free memory blocks on the drive decreases. The memory device, to provide the advertised capacity, shrinks the size of the SLC cache and converts the SLC to MLC. Once free space is created, the MLC may then be converted back to SLC.

Thus, for example, if the operating system detects a condition in which memory cells of the memory device are failing (e.g., through monitoring metrics in the Self-Monitoring, Analysis, and Reporting Technology (SMART) reporting of the drive, bit errors, or other criteria), the operating system may delete data from the memory device. This causes the memory device to reallocate MLC to SLC memory cells, moving data from less reliable storage to more reliable storage. To delete data, the operating system may compress operating system or user data, delete temporary files (e.g., cache, internet browsing history, cookies, a recycling or trash bin, or the like), reduce a page or swap file size, ask users to delete user data, or the like.

Figure 5:
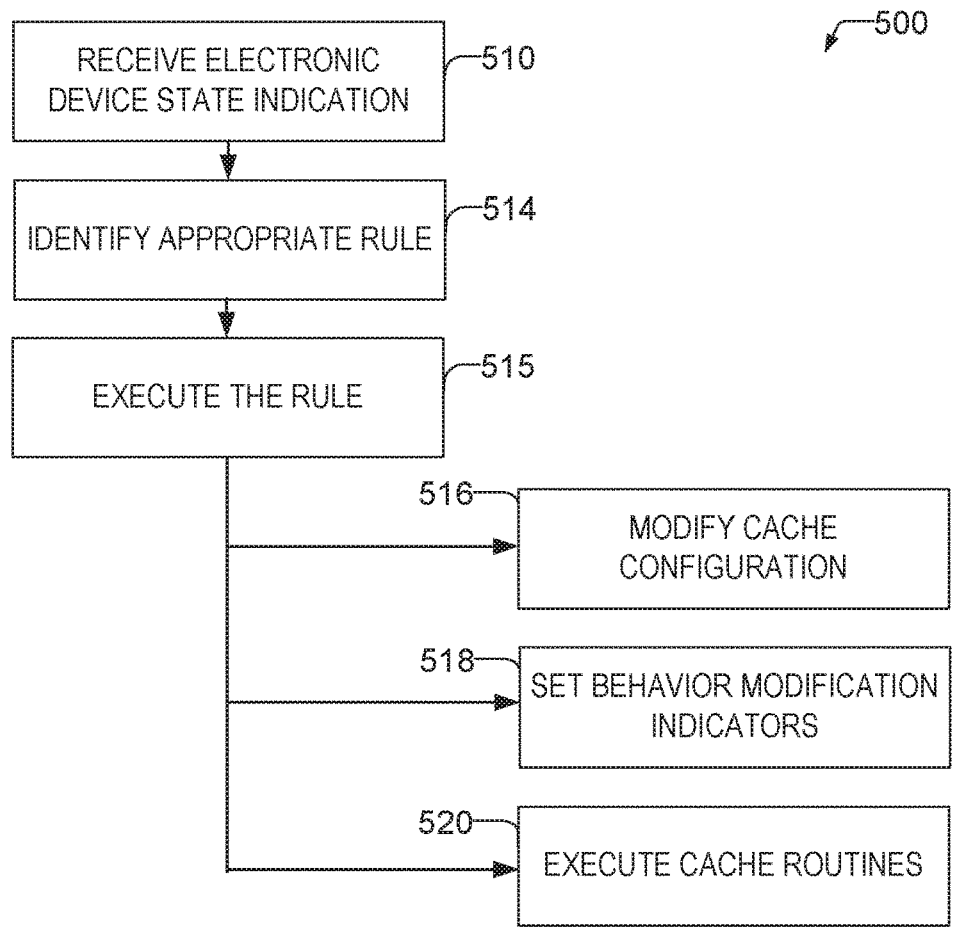
FIG. 5 illustrates a flowchart of a method of an operating system controlling a device performance according to some examples of the present disclosure.

Turning now to FIG. 5, a flowchart of a method 500 of an operating system controlling a device performance according to some examples of the present disclosure. At operation 510 an electronic device state condition indication may be received by the memory device from an operating system. For example, a low battery indication, an impending large transfer indication, a high ambient temperature indication, and the like may be received over an interface, such as a Universal Flash Storage (UFS) interface.

At operation 514, in some examples, the memory device may determine one or more rules for handling the received electronic device state indication. The memory device may be configured with a set of rules which specify how to alter the SLC cache given the device condition indication. The memory device may receive the electronic device state indication, ascertain the appropriate rule, and carry out the action in the rule. The rules may be executed at operation 515 and may specify that the memory device is to modify a cache configuration at operation 516, modify cache behavior indicators at operation 518, and/or execute one or more SLC cache routines at operation 520. The set of rules may be programmed into the memory device through a firmware object, an external programmer, over a communications interface from an operating system, and the like.

At operation 516, an SLC cache configuration may be altered based upon the indication received at operation 510 and the rule identified at operation 514. Example configuration alterations include modifying a size (increasing or decreasing) of the SLC cache, modifying which memory cells comprise the SLC cache (e.g., a physical placement of the SLC cache), and the like.

As one example, the electronic device state indication may be an indication that the operating system is ready to transfer a large amount of files. For example, the user may request a video or music stream, or may begin to save high definition video. A rule stored by the memory device may indicate that one or more available MLC memory cells are to be reconfigured to SLC cache upon receipt of this indication. The size of the increase in SLC cache may be specified by the rule, and in some examples may be a fixed size increase. In other examples, the rule may specify a formula that may depend on a number of factors, such as available MLC (e.g., LBA utilization), the expected size of the transfer (which may be provided by the operating system in the indication), and the like.

At operation 518 a behavior modification indicator of the SLC cache may be set to signal the memory device to modify a behavior of the cache. In some examples, this indication may involve setting a flag or utilizing some other data structure (as indicated by the rules) to indicate to the memory device that certain behaviors are altered. For example, upon receipt of a low power indication, the memory device may set a flag to bypass the SLC cache upon receipt of a write request to save power. Subsequent write requests may bypass the SLC cache and write directly to MLC if the flag is set.

In other examples, various cache routines may be called (as specified by the rules) at operation 520 in response to receiving certain electronic device state indications. For example, if the operating system indicates that the electronic device in which the memory device is installed is about to go to sleep or hibernate, a rule may specify that the memory device may begin garbage collection, and/or move data from the SLC cache to MLC storage and/or may reduce the size of the SLC cache.

In some examples, the indication may be that a power of the device is no longer low and to resume full power operations. For example, to place new writes to the SLC cache. In these examples, if a flag was set in the SLC cache profile to suspend writes to the SLC cache, the flag may be cleared.

Figure 6:
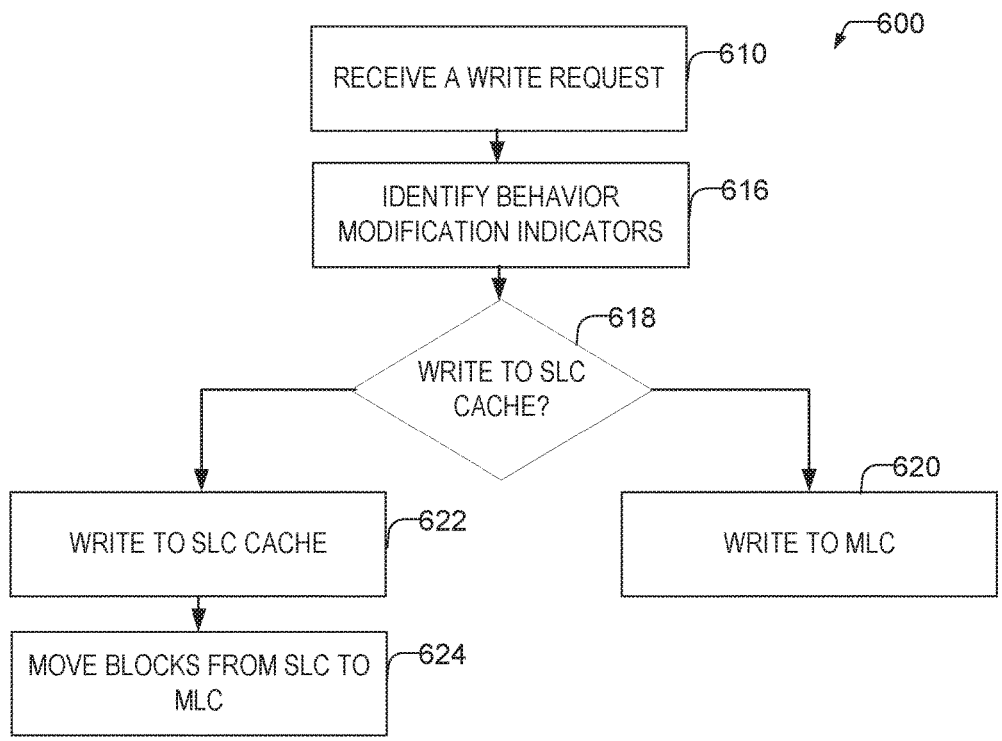
FIG. 6 illustrates a flowchart of a method of handling a write request at a memory device according to some examples of the present disclosure.

As the SLC cache behavior may be modified, the memory device may perform some operations differently, such as handling write requests. Turning now to FIG. 6 a flowchart of a method 600 of handling a write request at a memory device is shown according to some examples of the present disclosure. At operation 610 a write operation may be received by the memory device—e.g., over a UFS or other communications interface from a host. At operation 616 the memory device may identify whether any behavior modification indicators are present (e.g., any flags set). At operation 618, the memory device may determine based upon the behavior modification indicators whether to write the data from the request to the SLC cache. For example, if the memory device received an electronic device state indication that a low battery condition is present, an behavior modification indicator may be set to indicate that the memory device should not to store write requests to the SLC cache.

If at operation 618, the memory device determines not to write to the SLC cache, then at operation 620, the system may write the data directly to the MLC storage. If at operation 618, the memory device determines to write it to the SLC cache, then at operation 622, the system may write it to the SLC cache, and, subsequently (e.g., during an idle time), may move blocks from the SLC to the MLC.

Figure 7:
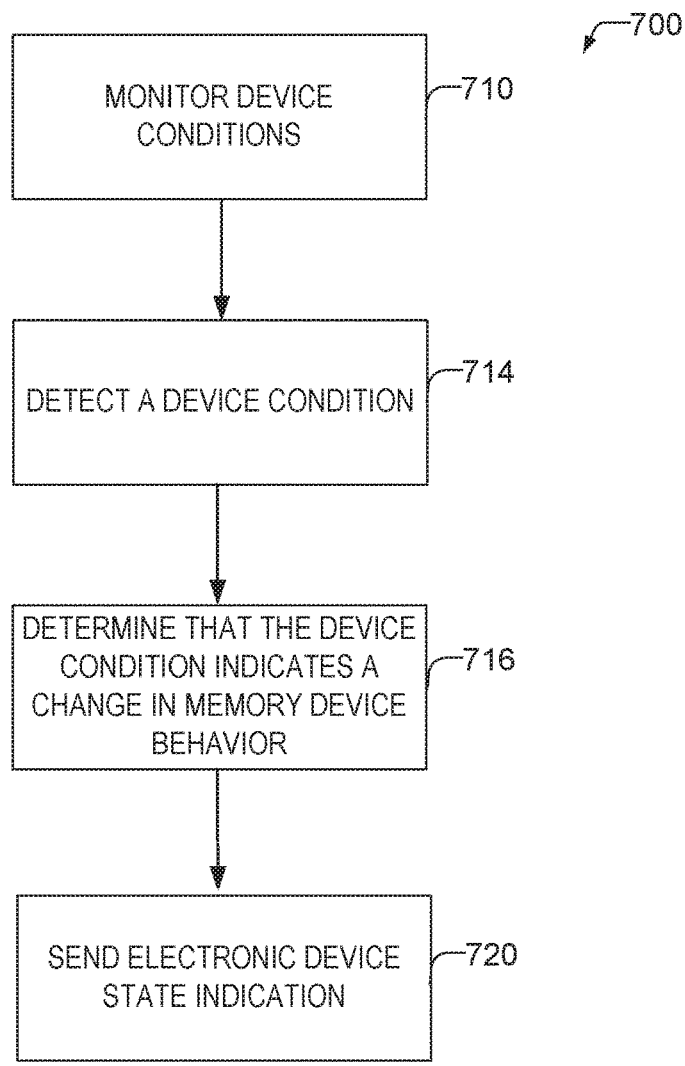
FIG. 7 illustrates a flowchart of a method of an operating system monitoring the electronic device and sending an electronic device state indication according to some examples of the present disclosure.

Turning now to FIG. 7, a flowchart of a method 700 of an operating system monitoring the electronic device and sending an electronic device state indication is shown according to some examples of the present disclosure. At operation 710 the operating system may monitor for one or more device conditions. Examples include an impending need to write a large amount of data to the memory device, high ambient temperatures, a low power condition, a return to a normal power condition after a low power condition, an impending sleep or hibernation, and the like. At operation 714, the device may detect one of these conditions. At operation 716 the operating system may determine that the device condition indicates a change in a memory device behavior. For example, the operating system may utilize a series of rules that specify which electronic device state indications are sent and in response to which device conditions. At operation 720, given that the device has determined that the device state condition is to be sent, the operating system sends the electronic device state indication to the memory device over a communications interface (e.g., UFS).

While the method 700 of FIG. 7 utilized an electronic device state indication message, as already noted, the operating system may change the SLC cache configuration and thus the memory device behavior characteristics by writing, deleting, moving, or otherwise manipulating data through normal read/write commands to the memory device.

Figure 8:
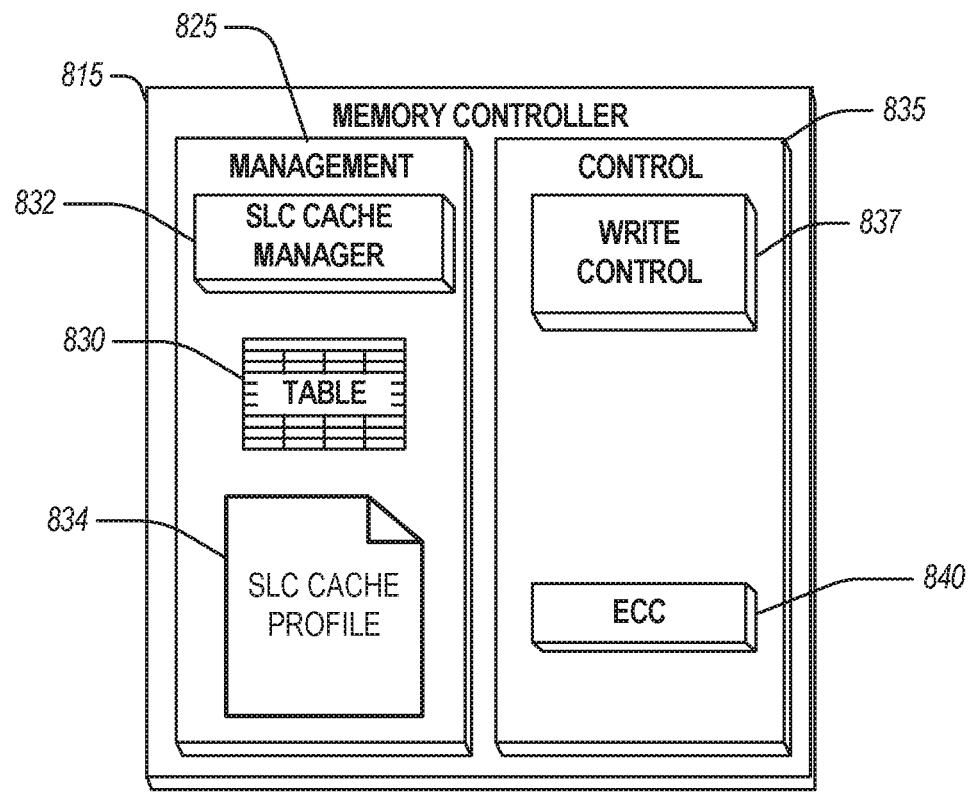
FIG. 8 illustrates a memory controller 815 according to some examples of the present disclosure.

FIG. 8 illustrates a memory controller 815 according to some examples of the present disclosure. The memory controller 815 may be one example implementation of memory controller 115 of FIG. 1. Memory manager 825 may be an example of memory manager 125, table 530 an example of table 130, controller 835 may be an example of controller 135, and ECC 840 may be an example of ECC 140. In some examples, the memory manager 825 may include an SLC cache manager 832. SLC cache manager 832 may load SLC cache behavior profile, such as SLC cache behavior profile 834, and utilized it to configure the SLC cache. SLC cache behavior profile 834 may comprise SLC cache configuration information, behavior modification indicators, and rulesets for processing electronic device state indications. SLC cache manager may read the SLC cache behavior profile in order to initialize the memory cells as either SLC or MLC. SLC cache manager 832 may also receive the electronic device state indication and in response update the SLC cache configuration and behavior indicators. The SLC cache behavior profile 834 may be hard coded into the memory device, may be in a working memory of the memory manager 825 (or the controller 835), may be located in storage of the memory device, may be sent from a host device over an interface (e.g., a UFS interface) and the like.

Write controller 837 may also utilize SLC cache behavior profile 834. For example, the SLC cache behavior profile 834 may include behavior modification indicators addition to configuration information that specifies modifications to a SLC cache behavior. For example, when writing to the memory cells of the memory device, the behavior modification indicators may specify that the memory device should write to MLC storage rather than utilize the SLC cache. Upon receiving a write request, the write controller 837 may check the SLC cache behavior profile 834 and may determine whether any behavior modification indicators effects the write request and if so, to take appropriate action.

Figure 9:
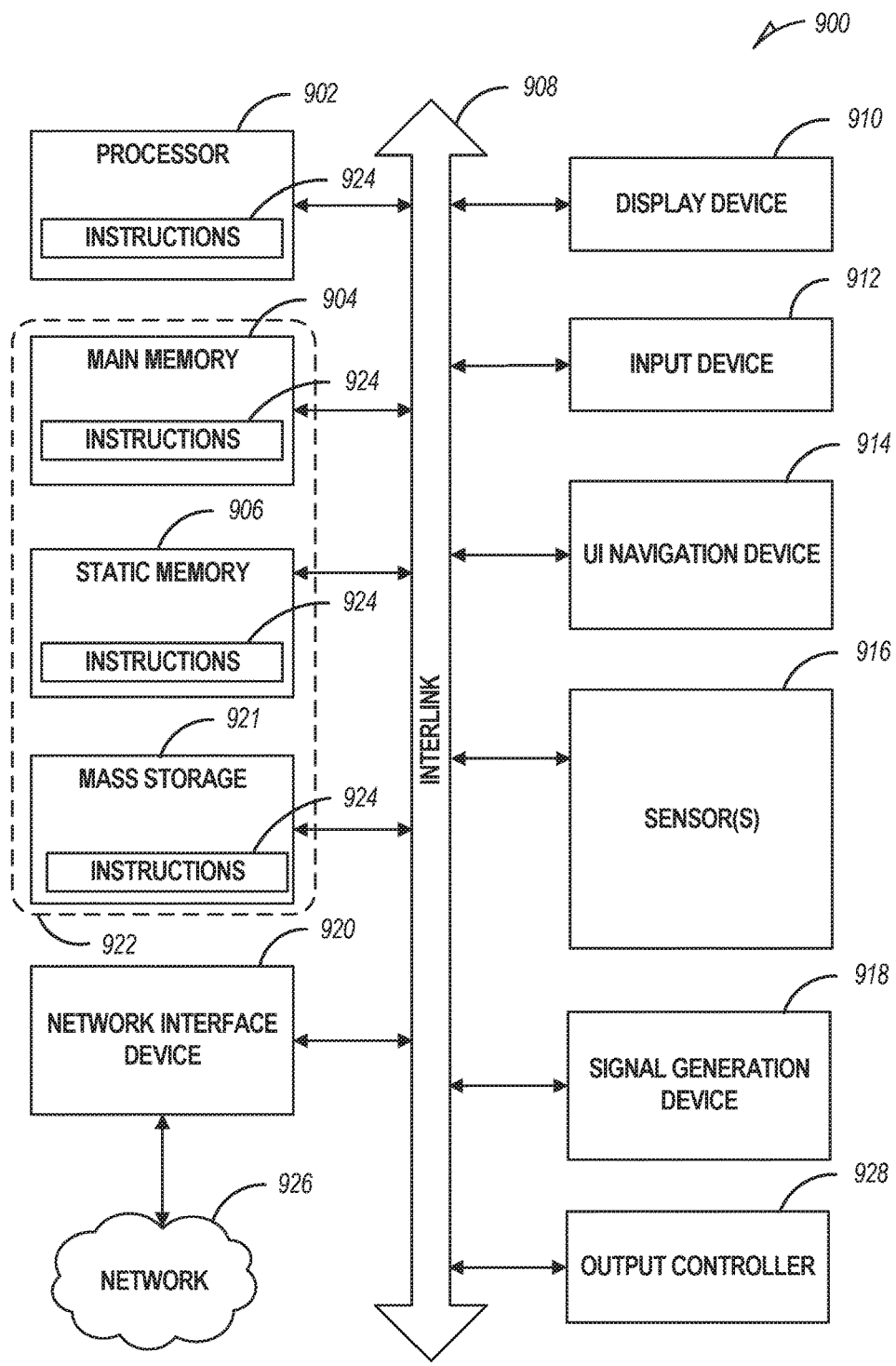
FIG. 9 is a block diagram illustrating an example of a machine upon which one or more embodiments may be implemented according to some examples of the present disclosure.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 900 (e.g., the host device 105, the memory device 110, etc.) may include a hardware processor 902 (e.g., a central processing unit (CPU), a graphics processing unit (GPU), a hardware processor core, or any combination thereof, such as the memory controller 115, etc.), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute the machine readable medium 922.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the memory 904 for use by the processor 902. The memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the memory 904 for use by the processor 902. When the memory 904 is full, virtual space from the storage device 921 can be allocated to supplement the memory 904; however, because the storage 921 device is typically slower than the memory 904, and write speeds are typically at least twice as slow as read speeds, use of virtual memory can greatly reduce user experience due to storage device latency (in contrast to the memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of memory 904, while reducing wear on the storage device 921.

Storage devices optimized for mobile electronic devices, or mobile storage, traditionally include MMC solid-state storage devices (e.g., micro Secure Digital (microSDT™)

cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 may further be transmitted or received over a communications network 926 using a transmission medium via the network interface device 920 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

NOTES AND EXAMPLES

Example 1 is a memory device, comprising: an array of memory cells, the memory cells in the array configurable as either a multi-level cell (MLC) configuration or a single level cell (SLC) configuration, memory cells in the array that are configured as SLC comprising an SLC cache; a controller, the controller executing firmware instructions, which cause the controller to perform operations comprising: receiving an indication from a host that a battery level measured by the host is below a predetermined threshold; and in response, placing data of a write request to memory cells of the array configured as MLC and not writing the cells to the SLC cache.

In Example 2, the subject matter of Example 1 optionally includes wherein the operations further comprise: Subsequent to receiving the indication from the host, receiving a second indication from the host, the second indication indicating that the battery level is above the predetermined threshold and in response, placing second data of a second request in the SLC cache; and subsequent to placing the data of the second request in the SLC cache, moving the second data of the second request to memory cells of the array configured as MLC.

In Example 3, the subject matter of any one or more of Examples 1-2 optionally include wherein the operations of receiving the indication from the host comprises receiving a message over a communications interface.

In Example 4, the subject matter of Example 3 optionally includes wherein the communication interface is an interface according to a Universal Flash Storage (UFS) device.

In Example 5, the subject matter of any one or more of Examples 1-4 optionally include wherein the operations further comprise delaying a reconfiguration of a MLC memory cell to an SLC memory cell responsive to the indication.

In Example 6, the subject matter of any one or more of Examples 1-5 optionally include wherein the host is associated with an operating system, and wherein the battery is a battery of a mobile computing device.

In Example 7, the subject matter of any one or more of Examples 1-6 optionally include wherein the operations further comprise: receiving an incoming large data transfer indication prior to receiving the incoming large data; reconfiguring a set of one or more memory cells of the array that are configured as MLC to SLC; receiving the incoming large data transfer and writing the incoming large data transfer to the SLC; and reconfiguring the set of one or more memory cells of the array that are configured as SLC back to MLC.

Example 8 is a machine-readable medium, comprising instructions, that when executed by a processor, cause the processor to perform operations comprising: at a memory device including an array of memory cells, the memory cells in the array configurable as either a multi-level cell (MLC) configuration or a single level cell (SLC) configuration, memory cells in the array that are configured as SLC comprising an SLC cache: receiving an indication from a host that a battery level measured by the host is below a predetermined threshold; and in response, placing data of a write request to memory cells of the array configured as MLC and not writing the cells to the SLC cache.

In Example 9, the subject matter of Example 8 optionally includes wherein the operations further comprise: Subsequent to receiving the indication from the host, receiving a second indication from the host, the second indication indicating that the battery level is above the predetermined threshold and in response, placing second data of a second request in the SLC cache; and subsequent to placing the data of the second request in the SLC cache, moving the second data of the second request to memory cells of the array configured as MLC.

In Example 10, the subject matter of any one or more of Examples 8-9 optionally include wherein the operations of receiving the indication from the host comprises receiving a message over a communications interface.

In Example 11, the subject matter of Example 10 optionally includes wherein the communication interface is an interface according to a Universal Flash Storage (UFS) device.

In Example 12, the subject matter of any one or more of Examples 8-11 optionally include wherein the operations further comprise delaying a reconfiguration of a MLC memory cell to an SLC memory cell responsive to the indication.

In Example 13, the subject matter of any one or more of Examples 8-12 optionally include wherein the host is associated with an operating system, and wherein the battery is a battery of a mobile computing device.

In Example 14, the subject matter of any one or more of Examples 8-13 optionally include wherein the operations further comprise: receiving an incoming large data transfer indication prior to receiving the incoming large data; reconfiguring a set of one or more memory cells of the array that are configured as MLC to SLC; receiving the incoming large data transfer and writing the incoming large data transfer to the SLC; and reconfiguring the set of one or more memory cells of the array that are configured as SLC back to MLC.

Example 15 is a method, comprising: at a memory device including an array of memory cells, the memory cells in the array configurable as either a multi-level cell (MLC) configuration or a single level cell (SLC) configuration, memory cells in the array that are configured as SLC comprising an SLC cache: receiving an indication from a host that a battery level measured by the host is below a predetermined threshold; and in response, placing data of a write request to memory cells of the array configured as MLC and not writing the cells to the SLC cache.

In Example 16, the subject matter of Example 15 optionally includes subsequent to receiving the indication from the host, receiving a second indication from the host, the second indication indicating that the battery level is above the predetermined threshold and in response, placing second data of a second request in the SLC cache; and subsequent to placing the data of the second request in the SLC cache, moving the second data of the second request to memory cells of the array configured as MLC.

In Example 17, the subject matter of any one or more of Examples 15-16 optionally include wherein receiving the indication from the host comprises receiving a message over a communications interface.

In Example 18, the subject matter of Example 17 optionally includes wherein the communication interface is an interface according to a Universal Flash Storage (UFS) device.

In Example 19, the subject matter of any one or more of Examples 15-18 optionally include delaying a reconfiguration of a MLC memory cell to an SLC memory cell responsive to the indication.

In Example 20, the subject matter of any one or more of Examples 15-19 optionally include wherein the host is associated with an operating system, and wherein the battery is a battery of a mobile computing device.

In Example 21, the subject matter of any one or more of Examples 15-20 optionally include receiving an incoming large data transfer indication prior to receiving the incoming large data; reconfiguring a set of one or more memory cells of the array that are configured as MLC to SLC; receiving the incoming large data transfer and writing the incoming large data transfer to the SLC; and reconfiguring the set of one or more memory cells of the array that are configured as SLC back to MLC.

Example 22 is a device, comprising: an array of memory cells, the memory cells in the array configurable as either a multi-level cell (MLC) configuration or a single level cell (SLC) configuration, memory cells in the array that are configured as SLC comprising an SLC cache; and means for receiving an indication from a host that a battery level measured by the host is below a predetermined threshold; and in response, means for placing data of a write request to memory cells of the array configured as MLC and not writing the cells to the SLC cache.

In Example 23, the subject matter of Example 22 optionally includes subsequent to receiving the indication from the host, means for receiving a second indication from the host, the second indication indicating that the battery level is above the predetermined threshold and in response, means for placing second data of a second request in the SLC cache; and subsequent to placing the data of the second request in the SLC cache, means for moving the second data of the second request to memory cells of the array configured as MLC.

In Example 24, the subject matter of any one or more of Examples 22-23 optionally include wherein the means for receiving the indication from the host comprises means for receiving a message over a communications interface.

In Example 25, the subject matter of Example 24 optionally includes wherein the communication interface is an interface according to a Universal Flash Storage (UFS) device.

In Example 26, the subject matter of any one or more of Examples 22-25 optionally include means for delaying a reconfiguration of a MLC memory cell to an SLC memory cell responsive to the indication.

In Example 27, the subject matter of any one or more of Examples 22-26 optionally include wherein the host is associated with an operating system, and wherein the battery is a battery of a mobile computing device.

In Example 28, the subject matter of any one or more of Examples 22-27 optionally include means for receiving an incoming large data transfer indication prior to receiving the incoming large data; means for reconfiguring a set of one or more memory cells of the array that are configured as MLC to SLC; means for receiving the incoming large data transfer and writing the incoming large data transfer to the SLC; and means for reconfiguring the set of one or more memory cells of the array that are configured as SLC back to MLC.

Example 29 is a memory device, comprising: an array of memory cells, the memory cells in the array configurable as either a multi-level cell (MLC) configuration or a single level cell (SLC) configuration, memory cells in the array that are configured as SLC comprising an SLC cache; a controller, the controller executing firmware instructions, which cause the controller to perform operations comprising: receiving an electronic device state indication over a communications interface, the electronic device state indication providing a state of a device in which the memory device is installed; identifying a rule for handling the electronic device state indication; and executing the rule by one of: modifying an SLC cache configuration; setting a behavior modification indicator; or executing an SLC cache routine.

In Example 30, the subject matter of Example 29 optionally includes wherein the operations of executing the rule comprises setting the behavior modification indicator, and wherein the operations further comprise: receiving a write request over the communications interface; identifying the behavior modification indicator; and responsive to the behavior modification indicator, satisfying the write request by writing data to memory cells configured as MLC.

In Example 31, the subject matter of any one or more of Examples 29-30 optionally include wherein the electronic device state indication is a low power indication, and wherein the operations of executing the rule comprises setting a behavior indicator to bypass the SLC cache.

In Example 32, the subject matter of any one or more of Examples 29-31 optionally include wherein the electronic device state indication is an impending large transfer, and wherein the operations of executing the rule comprises modifying the SLC cache configuration by increasing an amount of memory cells configured as SLC.

In Example 33, the subject matter of any one or more of Examples 29-32 optionally include wherein the electronic device state indication is an ambient temperature indication, and wherein the operations of executing the rule comprises setting a behavior indicator to bypass the SLC cache.

In Example 34, the subject matter of any one or more of Examples 29-33 optionally include wherein the electronic device state indication is provided by an operating system.

In Example 35, the subject matter of any one or more of Examples 29-34 optionally include wherein the electronic device state indication is a sleep or hibernate indication, and wherein the operations of executing the rule comprises executing an SLC cache routine to begin garbage collection.

Example 36 is a machine-readable medium, comprising instructions, that when performed by a machine, causes the machine to perform operations comprising: at a memory device including an array of memory cells, the memory cells in the array configurable as either a multi-level cell (MLC) configuration or a single level cell (SLC) configuration, memory cells in the array that are configured as SLC comprising an SLC cache: receiving an electronic device state indication over a communications interface, the electronic device state indication providing a state of a device in which the machine-readable medium is installed; identifying a rule for handling the electronic device state indication; and executing the rule by one of: modifying an SLC cache configuration; setting a behavior modification indicator; or executing an SLC cache routine.

In Example 37, the subject matter of Example 36 optionally includes wherein the operations of executing the rule comprises setting the behavior modification indicator, and wherein the operations further comprise: receiving a write request over the communications interface; identifying the behavior modification indicator; and responsive to the behavior modification indicator, satisfying the write request by writing data to memory cells configured as MLC.

In Example 38, the subject matter of any one or more of Examples 36-37 optionally include wherein the electronic device state indication is a low power indication, and wherein the operations of executing the rule comprises setting a behavior indicator to bypass the SLC cache.

In Example 39, the subject matter of any one or more of Examples 36-38 optionally include wherein the electronic device state indication is an impending large transfer, and wherein the operations of executing the rule comprises modifying the SLC cache configuration by increasing an amount of memory cells configured as SLC.

In Example 40, the subject matter of any one or more of Examples 36-39 optionally include wherein the electronic device state indication is an ambient temperature indication, and wherein the operations of executing the rule comprises setting a behavior indicator to bypass the SLC cache.

In Example 41, the subject matter of any one or more of Examples 36-40 optionally include wherein the electronic device state indication is provided by an operating system.

In Example 42, the subject matter of any one or more of Examples 36-41 optionally include wherein the electronic device state indication is a sleep or hibernate indication, and wherein the operations of executing the rule comprises executing an SLC cache routine to begin garbage collection.

Example 43 is a method, comprising: at a memory device including an array of memory cells, the memory cells in the array configurable as either a multi-level cell (MLC) configuration or a single level cell (SLC) configuration, memory cells in the array that are configured as SLC comprising an SLC cache: receiving an electronic device state indication over a communications interface, the electronic device state indication providing a state of a device in which the method is installed; identifying a rule for handling the electronic device state indication; and executing the rule by one of: modifying an SLC cache configuration; setting a behavior modification indicator; or executing an SLC cache routine.

In Example 44, the subject matter of Example 43 optionally includes wherein executing the rule comprises setting the behavior modification indicator, and wherein the method further comprises: receiving a write request over the communications interface; identifying the behavior modification indicator; and responsive to the behavior modification indicator, satisfying the write request by writing data to memory cells configured as MLC.

In Example 45, the subject matter of any one or more of Examples 43-44 optionally include wherein the electronic device state indication is a low power indication, and wherein executing the rule comprises setting a behavior indicator to bypass the SLC cache.

In Example 46, the subject matter of any one or more of Examples 43-45 optionally include wherein the electronic device state indication is an impending large transfer, and wherein executing the rule comprises modifying the SLC cache configuration by increasing an amount of memory cells configured as SLC.

In Example 47, the subject matter of any one or more of Examples 43-46 optionally include wherein the electronic device state indication is an ambient temperature indication, and wherein executing the rule comprises setting a behavior indicator to bypass the SLC cache.

In Example 48, the subject matter of any one or more of Examples 43-47 optionally include wherein the electronic device state indication is provided by an operating system.

In Example 49, the subject matter of any one or more of Examples 43-48 optionally include wherein the electronic device state indication is a sleep or hibernate indication, and wherein executing the rule comprises executing an SLC cache routine to begin garbage collection.

Example 50 is a device, comprising: at a memory device including an array of memory cells, the memory cells in the array configurable as either a multi-level cell (MLC) configuration or a single level cell (SLC) configuration, memory cells in the array that are configured as SLC comprising an SLC cache: means for receiving an electronic device state indication over a communications interface, the electronic device state indication providing a state of a device in which the device is installed; means for identifying a rule for handling the electronic device state indication; and means for executing the rule by one of: means for modifying an SLC cache configuration; means for setting a behavior modification indicator; or means for executing an SLC cache routine.

In Example 51, the subject matter of Example 50 optionally includes wherein executing the rule comprises setting the behavior modification indicator, and wherein the device further comprises: means for receiving a write request over the communications interface; means for identifying the behavior modification indicator; and means for responsive to the behavior modification indicator, satisfying the write request by writing data to memory cells configured as MLC.

In Example 52, the subject matter of any one or more of Examples 50-51 optionally include wherein the electronic device state indication is a low power indication, and wherein the means for executing the rule comprises means for setting a behavior indicator to bypass the SLC cache.

In Example 53, the subject matter of any one or more of Examples 50-52 optionally include wherein the electronic device state indication is an impending large transfer, and wherein the means for executing the rule comprises means for modifying the SLC cache configuration by increasing an amount of memory cells configured as SLC.

In Example 54, the subject matter of any one or more of Examples 50-53 optionally include wherein the electronic device state indication is an ambient temperature indication, and wherein the means for executing the rule comprises means for setting a behavior indicator to bypass the SLC cache.

In Example 55, the subject matter of any one or more of Examples 50-54 optionally include wherein the electronic device state indication is provided by an operating system.

In Example 56, the subject matter of any one or more of Examples 50-55 optionally include wherein the electronic device state indication is a sleep or hibernate indication, and wherein the means for executing the rule comprises means for executing an SLC cache routine to begin garbage collection.

The invention claimed is:

1. A memory device, comprising:
    an array of memory cells, the memory cells in the array configurable as either a multi-level cell (MLC) configuration or a single level cell (SLC) configuration, memory cells in the array that are configured as SLC comprising an SLC cache;
    a controller, the controller executing firmware instructions, which cause the controller to perform operations comprising:
        receiving an incoming large data transfer indication prior to receiving the data corresponding to the incoming large data transfer;
        responsive to receiving the incoming large data transfer indication, reconfiguring a first set of one or more memory cells of the array that are configured as MLC to SLC, a size of the set determined based upon a logical block address utilization and an expected size of the large data transfer;
        receiving the data corresponding to the incoming large data transfer and writing at least a portion of the data to the SLC cache;
        receiving an ambient temperature indication; and
        responsive to the ambient temperature indication, bypassing the SLC cache when servicing a subsequent write request.

2. The memory device of claim 1, wherein the operations of receiving the indication comprises receiving the indication from a host over a communications interface.

3. The memory device of claim 2, wherein the communication interface is an interface according to a Universal Flash Storage (UFS) device.

4. The memory device of claim 1, wherein the operations further comprise:
    receiving an indication from a host that a battery level measured by the host is below a predetermined threshold;
    responsive to receiving the indication from the host, placing data of a first write request in memory cells of the array configured as MLC and not writing the data in memory cells of the array configured as the SLC cache;
    subsequent to receiving the indication from the host, receiving a second indication from the host, the second indication indicating that the battery level is above the predetermined threshold and in response, placing second data of a second request in the SLC cache; and
    subsequent to placing the data of the second request in the SLC cache, moving the second data of the second request to memory cells of the array configured as MLC.

5. The memory device of claim 4, wherein the operations further comprise delaying a reconfiguration of a MLC memory cell to an SLC memory cell responsive to the indication from the host that the battery level measured by the host is below the predetermined threshold.

6. The memory device of claim 4, wherein the host is associated with an operating system, and wherein the battery is a battery of a mobile computing device.

7. A memory device, comprising:
    an array of memory cells, the memory cells in the array configurable as either a multi-level cell (MLC) configuration or a single level cell (SLC) configuration, memory cells in the array that are configured as SLC comprising an SLC cache;

a controller, the controller executing firmware instructions, which cause the controller to perform operations comprising:
  receiving an incoming large data transfer indication prior o receiving the data corresponding to the incoming large data transfer;
  responsive to receiving the incoming large data transfer indication, reconfiguring a first set of one or more memory cells of the array that are configured as MLC to SLC, a size of the set determined based upon a logical block address utilization and an expected size of the large data transfer;
  receiving the data corresponding to the incoming large data transfer and writing the data to the SLC cache;
  receiving an ambient temperature indication; and
  responsive to the ambient temperature indication, bypassing the SLC cache when servicing a subsequent write request.

8. The memory device of claim 7, wherein the operations further comprise receiving a low power indication, and in response, bypassing an SLC cache when servicing a subsequent write request.

9. The memory device of claim 7, wherein the large data transfer indication is provided by an operating system.

10. The memory device of claim 7, wherein the operations comprise receiving a sleep or hibernate indication, and in response, executing an SLC cache routine to begin garbage collection.

11. A non-transitory machine-readable medium, comprising instructions, that when performed by a machine, causes the machine to perform operations comprising:
  at a memory device including an array of memory cells, the memory cells in the array configurable as either a multi-level cell (MLC) configuration or a single level cell (SLC) configuration, memory cells in the array that are configured as SLC comprising an SLC cache:
    receiving an incoming large data transfer indication prior to receiving the data corresponding to the incoming large data transfer;
    responsive to receiving the incoming large data transfer indication, reconfiguring a first set of one or more memory cells of the array that are configured as MLC to SLC, a size of the set determined based upon a logical block address utilization and an expected size of the large data transfer;
    receiving the data corresponding to the incoming large data transfer and writing the data to the SLC cache;
    receiving an ambient temperature indication; and
    responsive to the ambient temperature indication, bypassing the SLC cache when servicing a subsequent write request.

12. The non-transitory machine-readable medium of claim 11, wherein the operations further comprise receiving a low power indication, and in response, bypassing an SLC cache when servicing a subsequent write request.

13. The non-transitory machine-readable medium of claim 11, wherein the large data transfer indication is provided by an operating system.

14. The non-transitory machine-readable medium of claim 11, wherein the operations comprise receiving a sleep or hibernate indication, and in response, executing an SLC cache routine to begin garbage collection.

* * * * *